(12) United States Patent
Wilson (10) Patent No.: US 7,341,221 B1
(45) Date of Patent: Mar. 11, 2008

(54) ATTITUDE DETERMINATION WITH MAGNETOMETERS FOR GUN-LAUNCHED MUNITIONS

(75) Inventor: Michael J. Wilson, Middletown, DE (US)

(73) Assignee: The United States of America as represented by the Sectretary of the Army, Washington, DC (US)

( * ) Notice: Subject to any disclaimer, the term of this patent is extended or adjusted under 35 U.S.C. 154(b) by 273 days.

(21) Appl. No.: 11/193,986

(22) Filed: Jul. 28, 2005

(51) Int. Cl.
  F42B 10/00 (2006.01)
  G06F 19/00 (2006.01)
  F41G 7/00 (2006.01)
  F42B 15/00 (2006.01)
(52) U.S. Cl. .................. 244/3.21; 244/3.1; 244/3.15
(58) Field of Classification Search ........... 244/3.1–3.3
  See application file for complete search history.

(56) References Cited

U.S. PATENT DOCUMENTS

| | | | | |
|---|---|---|---|---|
| 4,026,498 | A * | 5/1977 | Platus | 244/3.23 |
| 5,001,647 | A * | 3/1991 | Rapiejko et al. | 701/220 |
| 6,349,652 | B1 | 2/2002 | Hepner et al. | |
| 6,398,155 | B1 | 6/2002 | Hepner et al. | |
| 7,032,857 | B2 * | 4/2006 | Hua | 244/3.15 |
| 7,105,790 | B2 * | 9/2006 | Lamorlette | 244/3.2 |
| 2005/0040280 | A1 * | 2/2005 | Hua | 244/3.1 |

OTHER PUBLICATIONS

Bar-Itzhack, I. et al., "Attitude Determination From Vector Observations: Quaternion Estimation," IEEE Trans. On Aerospace and Electronic Systems, vol. AES-21, No. 1, Jan. 1985.
Bar-Itzhack, I. et al., "Recursive Attitude Determination From Vector Observations: Euler Angle Estimation," J. Guidance, Control, and Dynamics, vol. 10, No. 2, Mar.-Apr. 1987.
Mortari, D., "Euler-α Algorithm for Attitude Determination From Vector Observations," J. Guidance, Control, and Dynamics, vol. 21, No. 2, Mar.-Apr. 1998.
Santoni, F., et al., "Attitude Determination of Small Spinning Spacecraft Using Three-Axis Magnetometer and Solar Panel Data," Proc. IEEE Aerospace Mar. 2000, pp. 127-133.
Psiaki, M., "Global Magnetometer-Based Spacecraft Attitude and Rate Estimation," J. Guidance, Control, and Dynamics, vol. 27, No. 2, Mar.-Apr. 2004.
Michalareas, G., et al., "Spacecraft Attitude Estimation Based on Magnetometer Measurements and the Covariance Intersection Algorithm," Proc. IEEE Aerospace Mar. 2002, pp. 5-2205-5-2219.
Harkins, T., "Understanding Body-Fixed Sensor Output From Projectile Flight Experiments," ARL-TR-3029, U.S. Army Research Laboratory, Aberdeen Proving Ground, MD, Sep. 2003.

* cited by examiner

*Primary Examiner*—Bernarr E. Gregory
(74) *Attorney, Agent, or Firm*—Edward L. Stolarun; Richard A. Morgan (57) ABSTRACT

A system and method for performing attitude determination for projectiles comprises a projectile; a plurality of magnetometers arranged orthogonally to one another in the projectile, wherein the plurality of magnetometers are adapted to take first flight vector measurements of the projectile; a plurality of angular rate sensors in the projectile and proximate to the plurality of magnetometers, wherein the plurality of angular rate sensors are adapted to take second flight vector measurements of the projectile; a digital signal processor adapted to combine the first and second flight vector measurements to estimate Euler angles associated with a position of the projectile; and a calculator adapted to determine an attitude of the projectile based on the estimated Euler angles. Preferably, the plurality of magnetometers comprises three magnetometers aligned within the projectile, and wherein a first one of the magnetometers is aligned with a spin axis of the projectile.

12 Claims, 11 Drawing Sheets

ATTITUDE DETERMINATION WITH MAGNETOMETERS FOR GUN-LAUNCHED MUNITIONS

GOVERNMENT INTEREST

The embodiments of the invention described herein may be manufactured, used, and/or licensed by or for the United States Government.

BACKGROUND OF THE INVENTION

1. Field of the Invention

The embodiments of the invention generally relate to in-flight projectile data sensing and, more particularly, to attitude determination for projectiles.

2. Description of the Related Art

Recent advances in digital signal processor (DSP) technology provide the capability for low cost, real-time processing of navigation sensors. Generally, attitude determination is a critical element of a guidance, navigation, and control (GN&C) system, which can be implemented with DSPs. The requirements for GN&C systems onboard gun-launched munitions typically exclude many traditional attitude determination systems. Such systems typically use rate gyroscopes that are generally high cost devices and are typically not well-suited to munitions with high spin rates. Spacecraft systems have used magnetometers for attitude determination in conjunction with sun sensors or star trackers, both of which, however, are not typically available for projectile GN&C systems. Accordingly, there remains a need for an improved attitude determination technique for in-flight projectiles.

SUMMARY OF THE INVENTION

In view of the foregoing, the embodiments of the invention provide a method of performing attitude determination for projectiles, and a program storage device readable by computer, tangibly embodying a program of instructions executable by the computer to perform the method of performing attitude determination for projectiles, wherein the method comprises launching a projectile comprising a plurality of magnetometers arranged orthogonally to one another and a plurality of angular rate sensors proximate to the plurality of magnetometers; taking first flight vector measurements of the projectile using the plurality of magnetometers; taking second flight vector measurements of the projectile using the plurality of angular rate sensors; combining the first and second flight vector measurements to estimate Euler angles associated with a position of the projectile; and determining an attitude of the projectile based on the estimated Euler angles.

Preferably, the plurality of magnetometers comprises three magnetometers aligned within the projectile, and wherein a first one of the magnetometers is aligned with a spin axis of the projectile. Moreover, an output of each of the magnetometers is preferably proportional to a component of a magnetic field in a direction of a sensitive axis of each of the magnetometers. Furthermore, the method may further comprise obtaining Earth magnetic field vectors from coordinates of a launch of the projectile; and obtaining an initial azimuth angle in a magnetic coordinate system. Additionally, the method may further comprise transforming the magnetic coordinate system into a projectile navigation coordinate system. Also, the method preferably further comprises calculating an elevation angle and a roll angle of the projectile based on the first flight vector measurements.

Another embodiment of the invention provides a system for performing attitude determination for projectiles, wherein the system comprises a projectile; a plurality of magnetometers arranged orthogonally to one another in the projectile, wherein the plurality of magnetometers are adapted to take first flight vector measurements of the projectile; a plurality of angular rate sensors in the projectile and proximate to the plurality of magnetometers, wherein the plurality of angular rate sensors are adapted to take second flight vector measurements of the projectile; a digital signal processor adapted to combine the first and second flight vector measurements to estimate Euler angles associated with a position of the projectile; and a calculator adapted to determine an attitude of the projectile based on the estimated Euler angles.

Preferably, the plurality of magnetometers comprises three magnetometers aligned within the projectile, and wherein a first one of the magnetometers is aligned with a spin axis of the projectile. Preferably, an output of each of the magnetometers is proportional to a component of a magnetic field in a direction of a sensitive axis of each of the magnetometers. Furthermore, the processor may be further adapted to obtain Earth magnetic field vectors from coordinates of a launch of the projectile; and obtain an initial azimuth angle in a magnetic coordinate system. Additionally, the processor may be further adapted to transform the magnetic coordinate system into a projectile navigation coordinate system. Also, the processor is further preferably adapted to calculate an elevation angle and a roll angle of the projectile based on the first flight vector measurements.

The embodiments of the invention provide an attitude determination system that employs magnetometers and angular rate sensors with a DSP to provide a complete solution for all three Euler angles that describe the attitude of a projectile. Unlike some conventional attitude estimation systems that rely exclusively on costly rate gyroscopes, the embodiments of the invention use magnetometers to stabilize drift errors. Moreover, the embodiments of the invention fulfill the requirements of passive sensing, and high-G (e.g., 80,000 G) survivability.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIGS. 3(A) through 9 are graphical representations illustrating results achieved from experimental simulations testing the embodiments of the invention;

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for an improved attitude determination technique for in-flight projectiles. The embodiments of the invention achieve this by providing the capability for on-board attitude (orientation) determination for gun-launched projectiles, whereby a complete, real-time solution for all three Euler angles (azimuth, elevation, and roll) that describes a projectile's attitude is provided, which uses magnetometers and angular rate sensors processed by a DSP. Referring now to the drawings, and more particularly to FIGS. 1 through 11, where similar reference characters denote corresponding features consistently throughout the figures, there are shown preferred embodiments of the invention.

Figure 1:
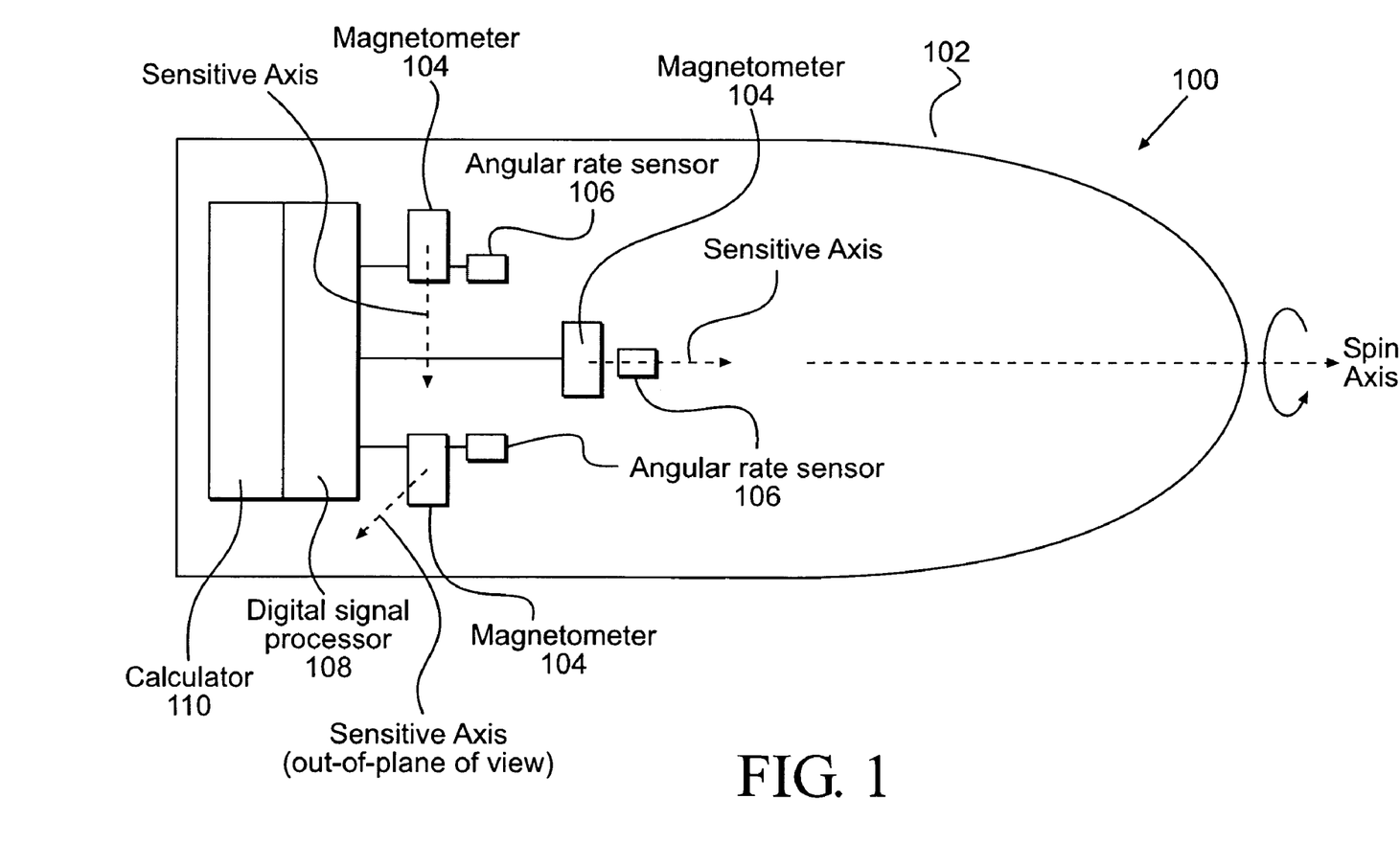
FIG. 1 illustrates a system diagram according to an embodiment of the invention.

FIG. 1 illustrates a system 100 for performing attitude determination for projectiles 102 according to an embodiment of the invention, wherein the system 100 comprises a projectile 102; a plurality of magnetometers 104 arranged orthogonally to one another in the projectile 102, wherein the plurality of magnetometers 104 are adapted to take first flight vector measurements of the projectile 102; a plurality of angular rate sensors 106 in the projectile 102 and proximate to the plurality of magnetometers 104, wherein the plurality of angular rate sensors 106 are adapted to take second flight vector measurements of the projectile 102; a digital signal processor 108 adapted to combine the first and second flight vector measurements to estimate Euler angles associated with a position of the projectile 102; and a calculator 110 adapted to determine an attitude of the projectile 102 based on the estimated Euler angles.

Preferably, the plurality of magnetometers 104 comprise three magnetometers aligned within the projectile 102, and wherein a first one of the magnetometers 104 is aligned with a spin axis of the projectile 102. Preferably, an output of each of the magnetometers 104 is proportional to a component of a magnetic field in a direction of a sensitive axis of each of the magnetometers 104. Furthermore, the processor 108 may be further adapted to obtain Earth magnetic field vectors from coordinates of a launch of the projectile 102; and obtain an initial azimuth angle in a magnetic coordinate system. Additionally, the processor 108 may be further adapted to transform the magnetic coordinate system into a projectile navigation coordinate system. Also, the processor 108 is further preferably adapted to calculate an elevation angle and a roll angle of the projectile 102 based on the first flight vector measurements.

Magnetometers 104 may be used to estimate partial attitude information. The embodiments of the invention operate in real-time and provide a full attitude solution for in-flight sensing by combining magnetometer data with angular rate sensor data. The embodiments of the invention achieve this by using a three-axis magnetometer design aligned within the projectile 102 so that the first magnetometer is aligned with the spin axis and the other two magnetometers are aligned orthogonally to the first and to each other. Each sensor output is proportional to the component of the magnetic field in the direction of the sensitive axis of the sensor. The magnetometer triad therefore resolves the Earth-fixed magnetic field vector in the projectile- or body-fixed coordinate system defined by the orientations of the magnetometers 104. This leads to a vector-matching methodology that estimates the Euler angles.

The embodiments of the invention provide a coordinate system transformation that allows the angular rate sensors 106 to naturally assist the attitude determination while keeping the system 100 heavily dependent on magnetometers 104. Accordingly, the embodiments of the invention are suitable for gun-launched munition applications, for which conventional multiple vector matching is not readily available. Many coordinate systems exist for describing projectile motion, such as those described in Harkins, T. E., "Understanding Body-Fixed Sensor Output From Projectile Flight Experiments," ARL-TR-3029, U.S. Army Research Laboratory, Aberdeen Proving Ground, MD, September 2003, pp. 1-27, the complete disclosure of which, in its entirety, is herein incorporated by reference.

Figure 2:
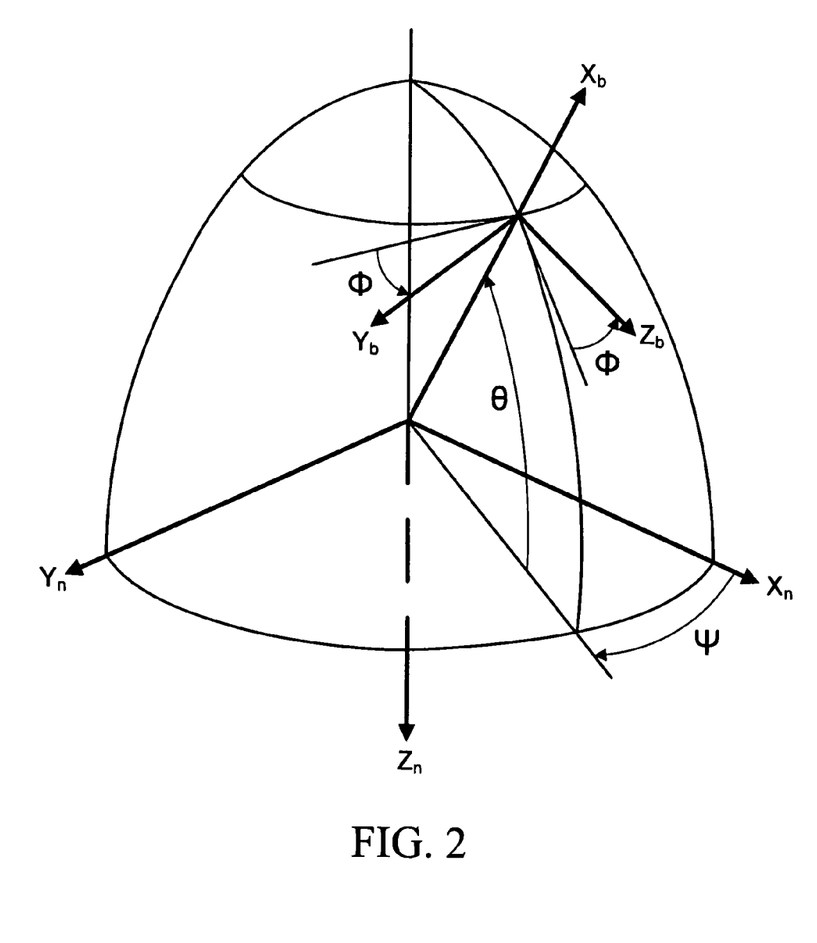
FIG. 2 illustrates a schematic diagram of the Euler angle relationship between the Earth-fixed Cartesian coordinate system and the orthogonal right-handed coordinate system according to the embodiments of the invention.

The parameters of interest (e.g., the Euler angles or an equivalent attitude description) considered by the embodiments of the invention, and further described below, are resolved in an Earth-fixed Cartesian reference frame $\{X_n, Y_n, Z_n\}$. This system is usually chosen to be the north, east, down system: the $X_n$ axis points northward in a local plane tangential to the Earth's surface. Likewise, the $Y_n$ axis points eastward. The right-handed system is completed with the $Z_n$ axis pointing toward the center of the Earth. The subscript n denotes this navigation frame $\{X_n, Y_n, Z_n\}$. Accordingly, $\{X_b, Y_b, Z_b\}$ is chosen to represent a body-fixed Cartesian system with the $X_b$ axis along the body's axis of symmetry or spin axis pointed in the direction of motion and the $Y_b$ and $Z_b$ oriented to complete the orthogonal right-handed system. The subscript b denotes this frame. FIG. 2 shows both coordinate systems and the Euler angle relations between them.

The transformation between the navigation frame and the body frame is described below. The navigation frame is first rotated about the $Z_n$ axis through an azimuth angle $\psi_{n \to b}$. The system is then rotated about the new Y axis through an elevation angle $\theta_{n \to b}$. Finally, the system is rotated about the new X axis through a roll angle $\phi_{n \to b}$. The two systems are related by a Direction Cosine Matrix (DCM), $C(\vec{\alpha}_{n \to b})$, parameterized by the three Euler angles, $\vec{\alpha}_{n \to b} = (\psi_{n \to b}, \theta_{n \to b}, \phi_{n \to b})^T$. The form for the DCM is:

$$C(\vec{\alpha}) = \begin{bmatrix} \cos(\psi)\cos(\theta) & \sin(\psi)\cos(\theta) & -\sin(\theta) \\ \begin{pmatrix} \cos(\psi)\sin(\theta)\sin(\phi) \\ -\sin(\psi)\cos(\phi) \end{pmatrix} & \begin{pmatrix} \sin(\psi)\sin(\theta)\sin(\phi) \\ +\cos(\psi)\cos(\phi) \end{pmatrix} & \cos(\theta)\sin(\phi) \\ \begin{pmatrix} \cos(\psi)\sin(\theta)\cos(\phi) \\ +\sin(\psi)\sin(\phi) \end{pmatrix} & \begin{pmatrix} \sin(\psi)\sin(\theta)\cos(\phi) \\ -\cos(\psi)\sin(\phi) \end{pmatrix} & \cos(\theta)\cos(\phi) \end{bmatrix}. \quad (1)$$

It is first assumed that the angular velocity vector of the projectile-fixed system with respect to the Earth-fixed system is denoted as $\vec{\Omega}_b = (p,q,r)_T$, in which p is the angular velocity of the $Y_b$ and $Z_b$ axes about the $X_b$ axis; q is the angular velocity of the $Z_b$ and $X_b$ axes about the $Y_b$ axis; and r is the angular velocity of the $X_b$ and $Y_b$ axes about the $Z_b$ axis. The embodiments of the invention then estimate the Euler angles that relate the body frame to the navigation frame by using vector matching. A direct approach is considered, based on a transformation to an intermediate coordinate system. With magnetometer values and knowledge of the local magnetic field, the magnetic field vector can be matched in the Earth- and body-fixed systems. The angular rate sensors 106 (of FIG. 1) are then used to determine the ambiguity that results from only one vector match.

Next, it is assumed that $\vec{H}_n$ and $\vec{H}_b$ are the Earth's magnetic field vector resolved in the navigation and body frames, respectively. The vectors are related by:

$$\vec{H}_b = C(\vec{\alpha}_{n \to b})\vec{H}_n \quad (2)$$

in which $C(\vec{\alpha})$ is given by Equation (1). Equation (2) represents three simultaneous equations involving $\psi_{n \to b}$, $\theta_{n \to b}$, and $\phi_{n \to b}$. To simplify the solution, an intermediate coordinate system is introduced that separates the variables.

Next, it is assumed that $\{X_m, Y_m, Z_m\}$ represents an Earth-fixed Cartesian coordinate system such that the $Z_m$ axis is in the direction of $\vec{H}_n$. $\{X_m, Y_m, Z_m\}$ is referred to herein as the magnetic coordinate system, and the subscript m denotes this frame. It is assumed that $C(\vec{\alpha}_{n \to m})$ is the DCM that transforms from the navigation frame to $\{X_m, Y_m, Z_m\}$, and $C(\vec{\alpha}_{m \to b})$ is the DCM that transforms from $\{X_m, Y_m, Z_m\}$ to the body frame where $\vec{\alpha}_{m \to b} = (\psi_{m \to b}, \theta_{m \to b}, \phi_{m \to b})^T$. Now, since:

$$\psi_{m \to b}(t) = \quad (3)$$
$$\psi_{m \to b,0} + \int_{\tau=0}^{t} \frac{q(t)\sin[\phi_{m \to b}(t)] + r(t)\cos[\phi_{m \to b}(t)]}{\cos[\theta_{m \to b}(t)]} dt \cdot \vec{H}_m = (0, 0, 1)^T$$

by definition, using $C(\vec{\alpha}_{m \to b})$ to transform $\vec{H}_m$ into the body-fixed system results in the following three equations:

$$\vec{H}_{b,x} = -\sin(\theta_{m \to b}) \quad (4)$$

$$\vec{H}_{b,y} = \cos(\theta_{m \to b})\sin(\theta_{m \to b}) \quad (5)$$

$$\vec{H}_{b,z} = \cos(\theta_{m \to b})\cos(\theta_{m \to b}) \quad (6)$$

Since $\vec{H}_b$ is known from the magnetometer sensor values, $\theta_{m \to b}$ can be solved for as:

$$\theta_{m \to b} = \arcsin(-\vec{H}_{b,x}) \quad (7)$$

in which arcsin $(-H_{b,x})$ is defined on the range $$\left(-\frac{\pi}{2}, \frac{\pi}{2}\right).$$

This can then be solved for as:

$$\phi_{m \to b} = \arctan\left(\frac{H_{b,y}}{H_{b,z}}\right) \quad (8)$$

in which arctan $$\left(\frac{H_{b,y}}{H_{b,z}}\right)$$

is the four-quadrant arctan function.

However, magnetometers 104 (of FIG. 1) alone cannot provide a complete attitude solution since $\psi_{m \to b}$ cannot be determined. Accordingly, the angular rate sensors 106 (of FIG. 1) effectively provide measurements of the angular rates q and r. The angular rate vector, $\vec{\Omega}_b = (p,q,r)^T$, is related to the Euler rate vector, $\vec{\dot\alpha}_m = (\dot\phi_m, \dot\theta_m, \dot\psi_m)$ through the transformation:

$$\vec{\dot\alpha} = \begin{bmatrix} 1 & \sin(\phi)\tan(\theta) & \cos(\phi)\tan(\theta) \\ 0 & \cos(\phi) & -\sin(\phi) \\ 0 & \frac{\sin(\phi)}{\cos(\theta)} & \frac{\cos(\phi)}{\cos(\theta)} \end{bmatrix} \vec{\Omega}_b. \quad (9)$$

The temporal derivative of $\psi_{m \to b}$ is then:

$$\dot\psi_{m \to b}(t) = \frac{q(t)\sin[\phi_{m \to b}(t)] + r(t)\cos[\phi_{m \to b}(t)]}{\cos[\theta_{m \to b}(t)]}. \quad (10)$$

Then, $\psi_{m \to b}$ can be obtained by integrating $\dot\psi_{m \to b}(t)$ with knowledge of the initial condition, $\psi_{m \to b,0}$:

$$\psi_{m \to b}(t) = \psi_{m \to b,0} + \int_{\tau=0}^{t} \dot\psi_{m \to b}(t) dt. \quad (11)$$

$C(\vec{\alpha}_{n \to b})$ can now be calculated with:

$$C(\vec{\alpha}_{n \to b}) = C(\vec{\alpha}_{m \to b})C(\vec{\alpha}_{n \to s}) \quad (12)$$

However, Equation (8) may be unreliable when $H_{b,y}$ and $H_{b,z}$ are both close to zero. This corresponds to singular points in the Euler angle attitude description when the spin axis of the projectile 102 (of FIG. 1) is in the direction of the Earth's magnetic field or the opposite direction. Since $\phi_s$ cannot be determined, $\psi_s$ is also undefined. In many cases, this is not an issue since the projectile 102 may never point in the singular direction throughout its flight. However, if this is not the case, the angular rate sensor output may be integrated to revise the last known stable solution until the magnetometer solution is again stable. Another rate sensor to determine the spin rate could also be used.

Generally, the embodiments of the invention provide a technique for attitude determination for a projectile 102. This is accomplished by obtaining $\vec{H}_n$ from a magnetic model for the coordinates of the launch of the projectile 102. Also, the initial azimuth angle is obtained in the magnetic coordinate system, $\psi_{m,0}$. For each new set of sensor values, $\theta_m(t)$ and $\phi_m(t)$ are calculated from the magnetometer values, $\vec{H}_b$, as:

$$\theta_{m \to b}(t) = \arcsin[-H_{b,x}(t)] \quad (13)$$

-continued $$\phi_{m \to b}(t) = \arctan\left[\frac{H_{b,y}(t)}{H_{b,z}(t)}\right]. \quad (14)$$

Then, the $\psi_m(t)$ revision is calculated using the angular rate sensors 106 as:

$$\psi_{m \to b}(t) = \psi_{m \to b,0} + \int_{\tau=0}^{t} \frac{q(t)\sin[\phi_{m \to b}(t)] + r(t)\cos[\phi_{m \to b}(t)]}{\cos[\theta_{m \to b}(t)]} dt. \quad (15)$$

Then, $C(\vec{\alpha}_{m \to b})$ is formed and the following equation:

$$C(\vec{\alpha}_{n \to b}) = C(\vec{\alpha}_{m \to b})C(\vec{\alpha}_{n \to s}) \quad (16)$$

is used to obtain the full attitude solution.

The above set of equations is designed in accordance with the embodiments of the invention so that they are easily implemented in real-time on a DSP 108 (of FIG. 1). This is accomplished because each of the sensor's values is sampled in time at an appropriate rate. The elevation and roll angles and the derivative of the azimuth angle only depend on the current sensor samples and are therefore straightforward to implement. At each new sample point, the derivative of the azimuth angle times the sampling period is added to the previous azimuth angle. It is then possible to transform into any navigation frame.

Figure 3A:
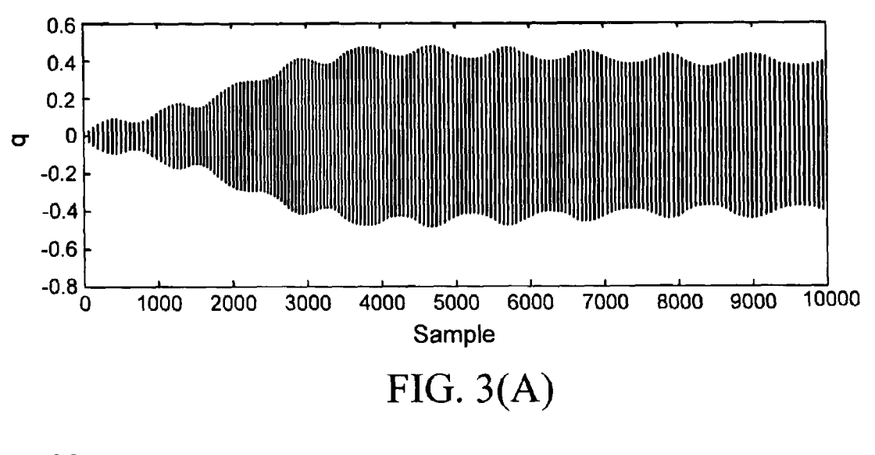
Figure 3B:
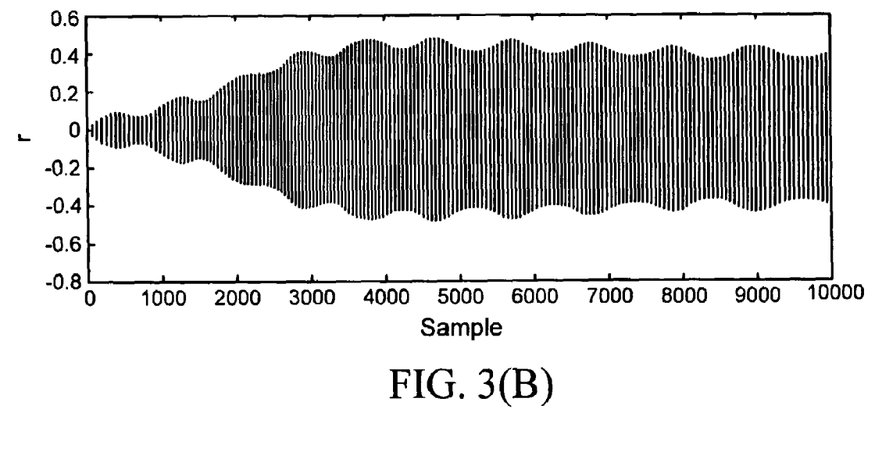

Simulations were conducted with equations (13) through (16) on simulated flight data to evaluate the performance of the embodiments of the invention. A 10-second flight on an M483 round projectile was generated via the well-known U.S. Army CONTRAJ (control trajectory simulation) with a gun elevation of 20 degrees and an initial muzzle velocity of 274 meters per second. From the generated flight data, the sensor values (magnetometers 104 and angular rate sensors 106) were derived. Additive white Gaussian noise was then added to the sensor values at various noise powers. The methodology provided by the embodiments of the invention was then run to generate estimates of the Euler angles. FIGS. 3(A) and 3(B) plot the angular rates throughout the flight as measured by the sensors at a 37-dB signal-to-noise ratio (SNR). FIGS. 3(A) and 3(B) are graphs of the angular rate outputs as measured by the sensors. These graphs are simply the noisy inputs to the methodology provided by the embodiments of the invention. FIGS. 3(A) and 3(B) demonstrate that the embodiments of the invention are effective with realistic sensor output.

Figure 4A:
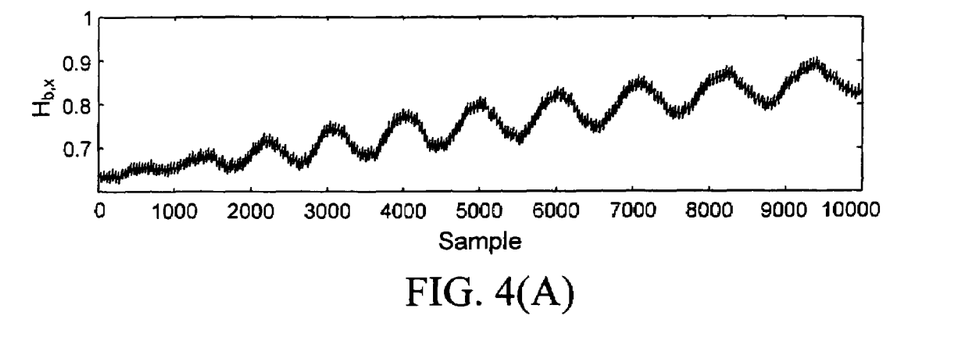
Figure 4B:
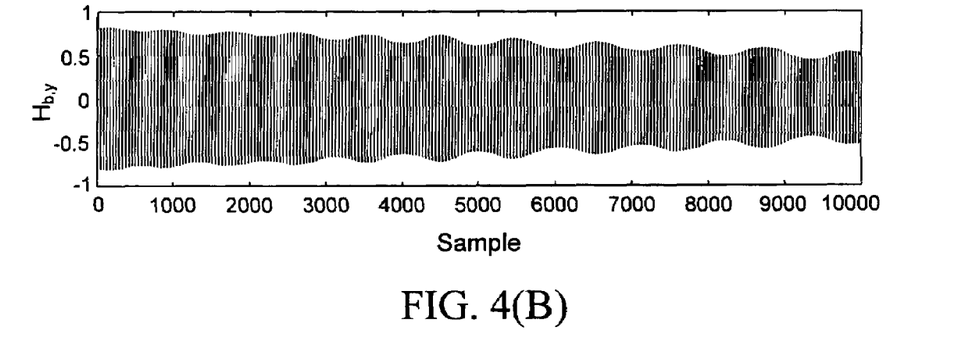
Figure 4C:
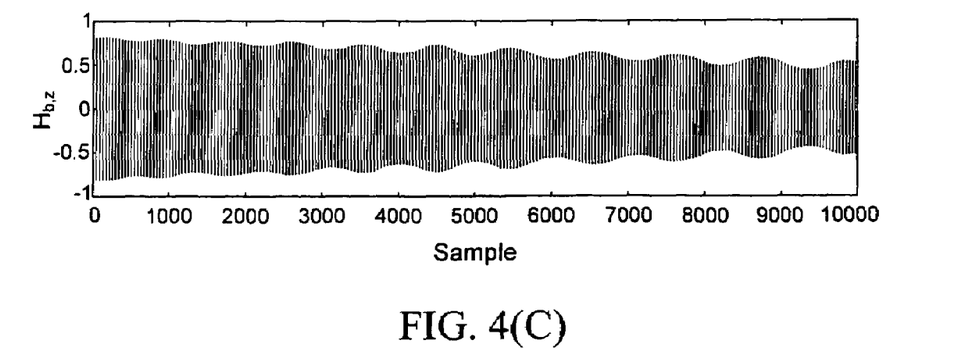
Figure 5A:
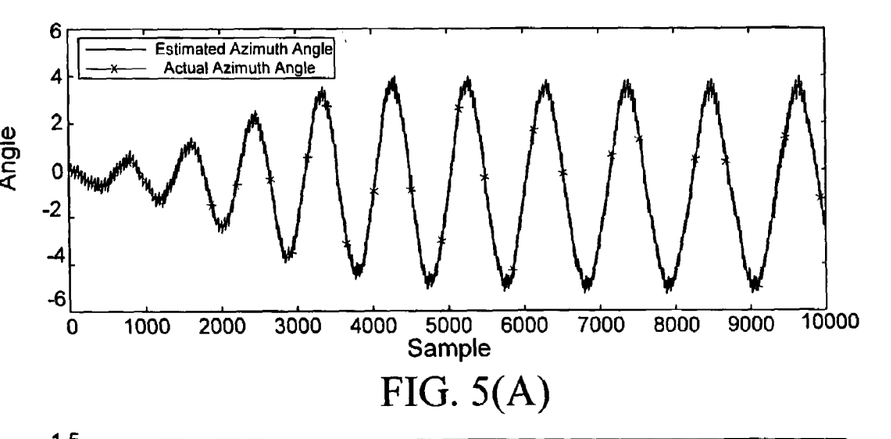
Figure 5B:
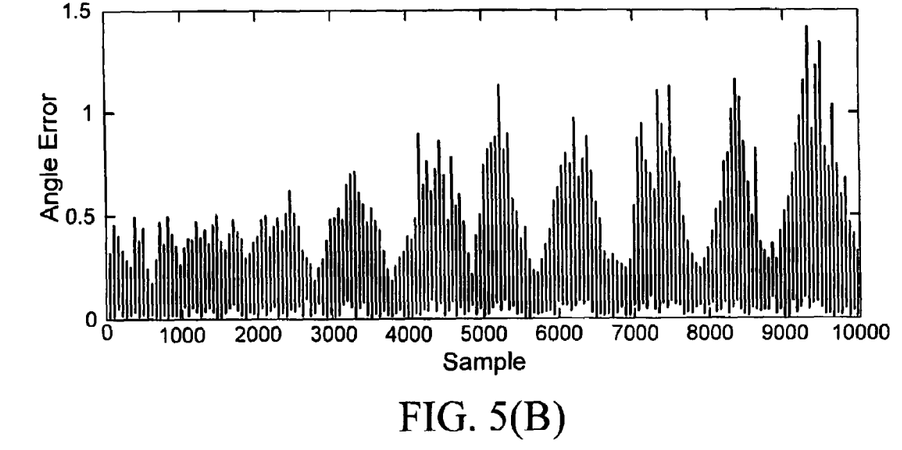
Figure 6A:
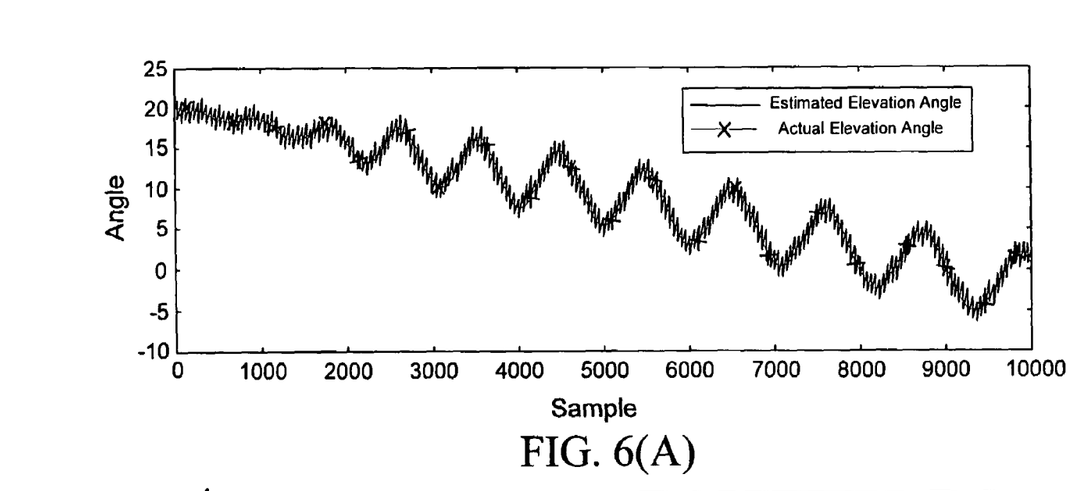
Figure 6B:
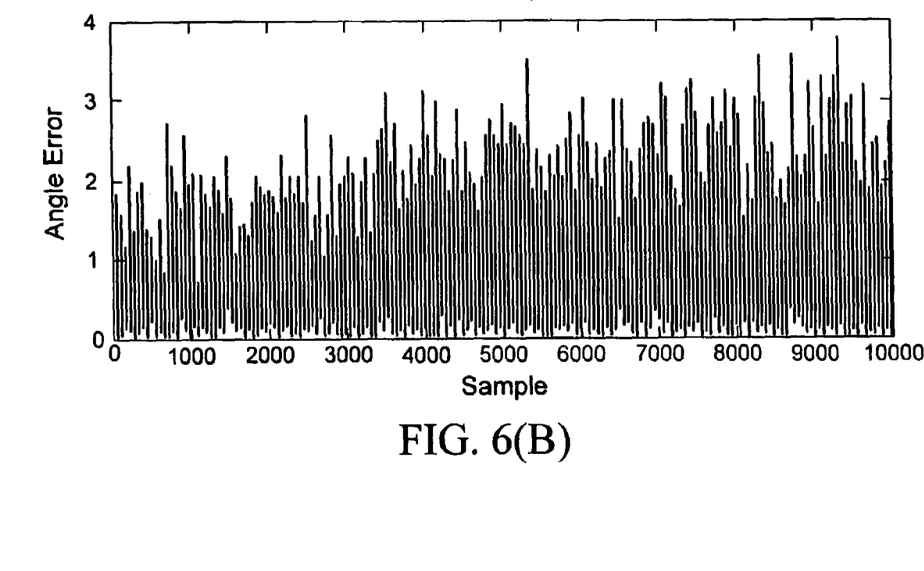
Figure 7A:
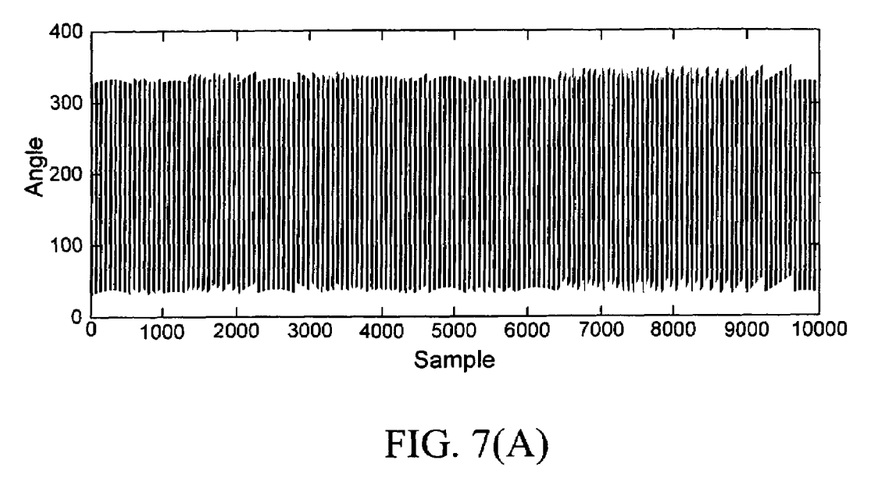
Figure 7B:
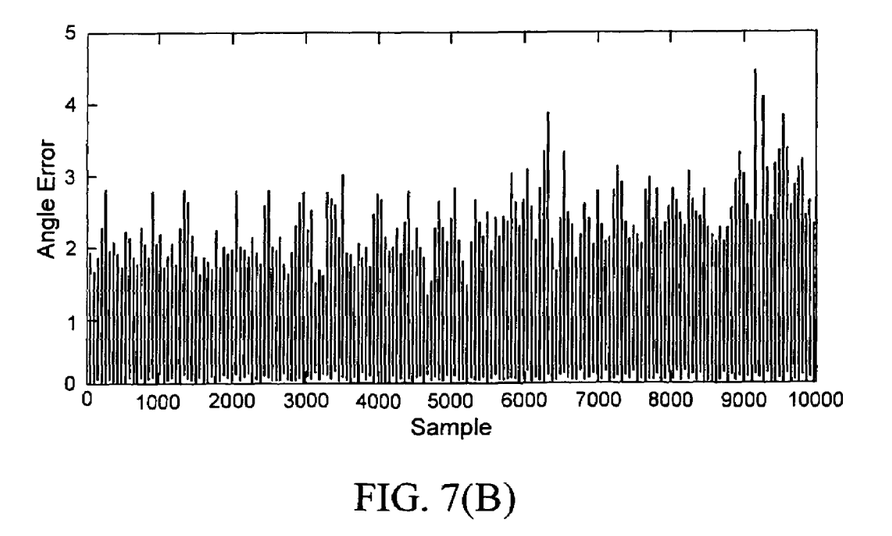
Figure 8A:
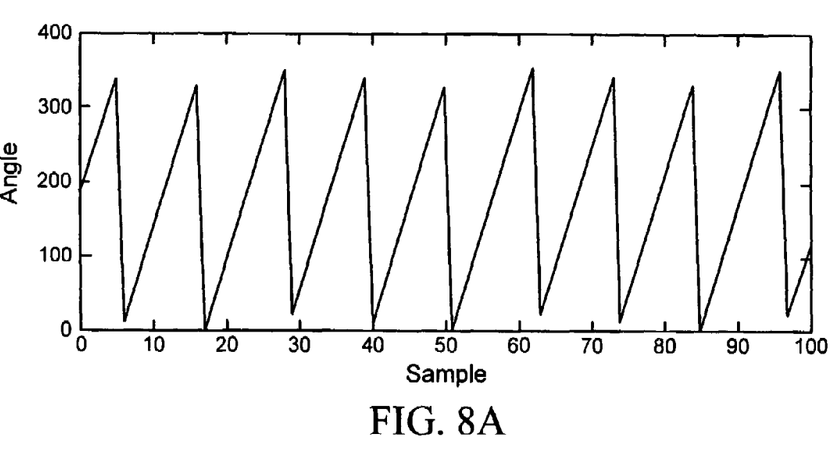
Figure 8B:
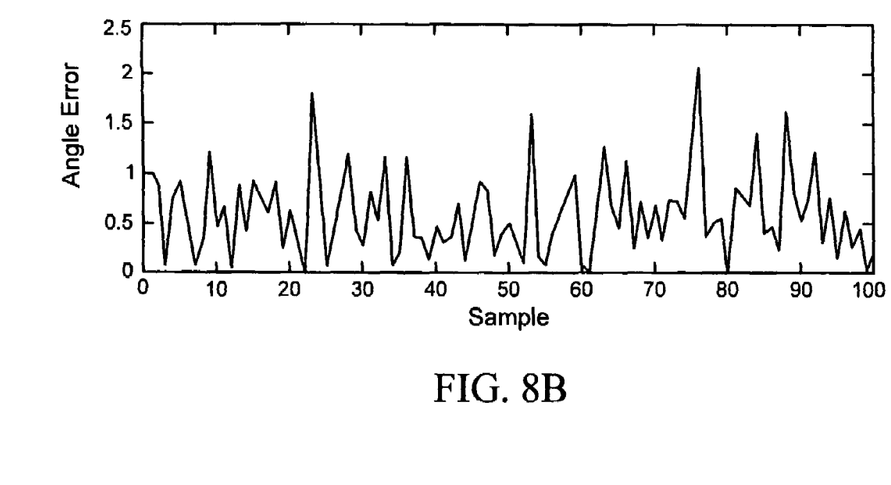

Likewise, FIGS. 4(A) and 4(B) plot the magnetometer output at the same SNR. The orthogonality of the spin axis to the Earth's magnetic field is demonstrated in FIG. 4(A), which is effectively the inner product between the two vectors (FIGS. 4(B) and 4(C) demonstrate the other two components of the magnetic field in the body system). The methodology provided by the embodiments of the invention is optimally functional when the two vectors are orthogonal. This simulation demonstrates the performance of the methodology provided by the embodiments of the invention when this is not the case (i.e., when the two vectors are not orthogonal). FIGS. 4(A) through 4(C) are graphs of the magnetic field measurements as measured by the sensors. Moreover, FIGS. 4(A) through 4(C) demonstrate that the embodiments of the invention are effective with realistic sensor output.

Figure 9:
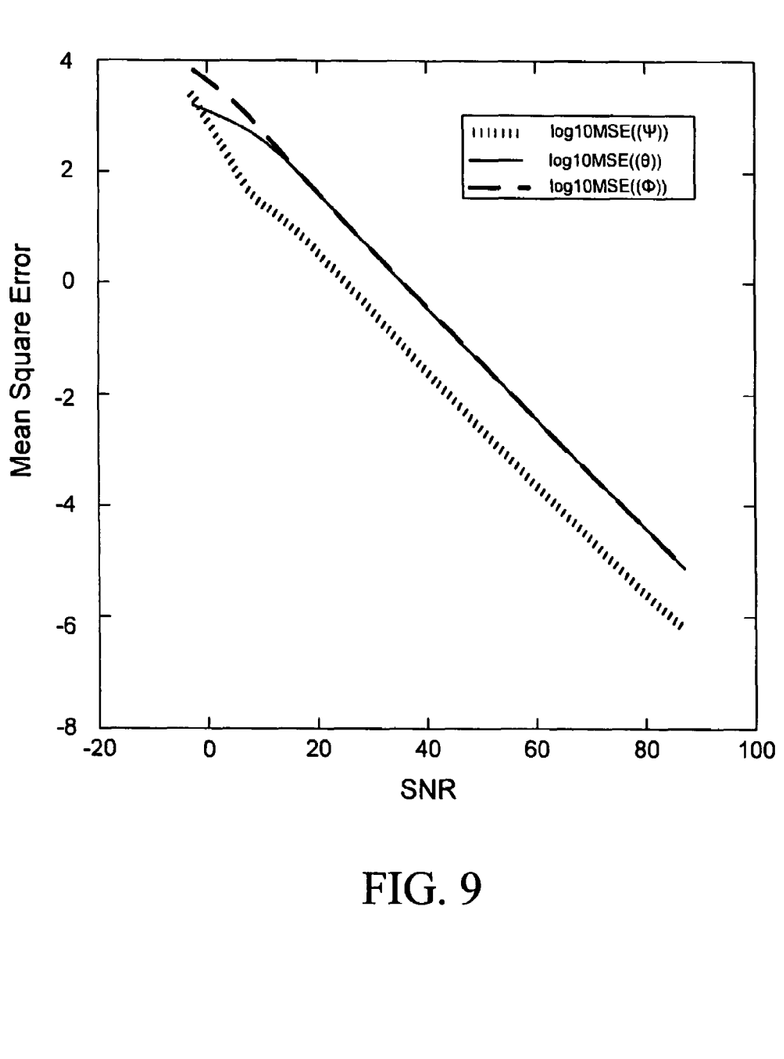

FIGS. 5(A) through 8(B) illustrate the plots of the actual Euler angles and the corresponding error throughout the flight of the simulated projectile. FIG. 9 shows the performance of the methodology provided by the embodiments of the invention for this simulation by plotting the mean square error of the Euler angles as a function of the SNR. Each of FIGS. 5(A) through 8(B) demonstrates that the error in the estimates is small when the error in the sensor output is realistic. FIGS. 5(A), 6(A), 7(A), and 8(A) plot the actual parameters, while FIGS. 5(B), 6(B), 7(B), and 8(B) plot the absolute value of the difference between the actual parameter and the estimated parameter.

Figure 10:
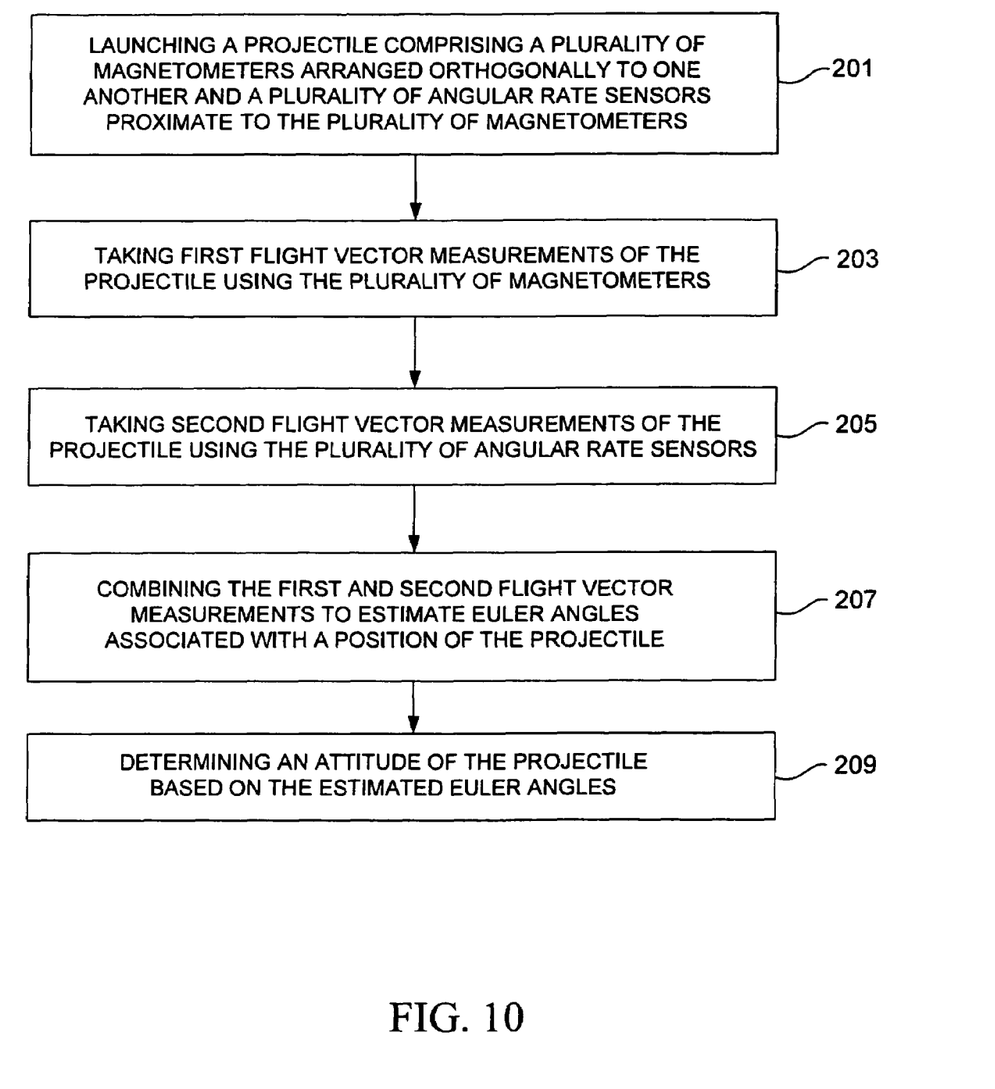
FIG. 10 is a flow diagram illustrating a preferred method according to an embodiment of the invention.

FIG. 10 (with reference to FIGS. 1 through 9) is a flow diagram illustrating a method of performing attitude determination for projectiles 102, wherein the method comprises launching (201) a projectile 102 comprising a plurality of magnetometers 104 arranged orthogonally to one another and a plurality of angular rate sensors 106 proximate to the plurality of magnetometers 104; taking (203) first flight vector measurements of the projectile 102 using the plurality of magnetometers 104; taking (205) second flight vector measurements of the projectile 102 using the plurality of angular rate sensors 106; combining (207) the first and second flight vector measurements to estimate Euler angles associated with a position of the projectile 102; and determining (209) an attitude of the projectile 102 based on the estimated Euler angles.

Preferably, the plurality of magnetometers 104 comprise three magnetometers aligned within the projectile 102, and wherein a first one of the magnetometers 104 is aligned with a spin axis of the projectile 102. Moreover, an output of each of the magnetometers 104 is preferably proportional to a component of a magnetic field in a direction of a sensitive axis of each of the magnetometers 104. Furthermore, the method may further comprise obtaining Earth magnetic field vectors from coordinates of a launch of the projectile 102; and obtaining an initial azimuth angle in a magnetic coordinate system. Additionally, the method may further comprise transforming the magnetic coordinate system into a projectile navigation coordinate system. Also, the method preferably further comprises calculating an elevation angle and a roll angle of the projectile 102 based on the first flight vector measurements.

The embodiments of the invention can take the form of an entirely hardware embodiment, an entirely software embodiment or an embodiment including both hardware and software elements. In one embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
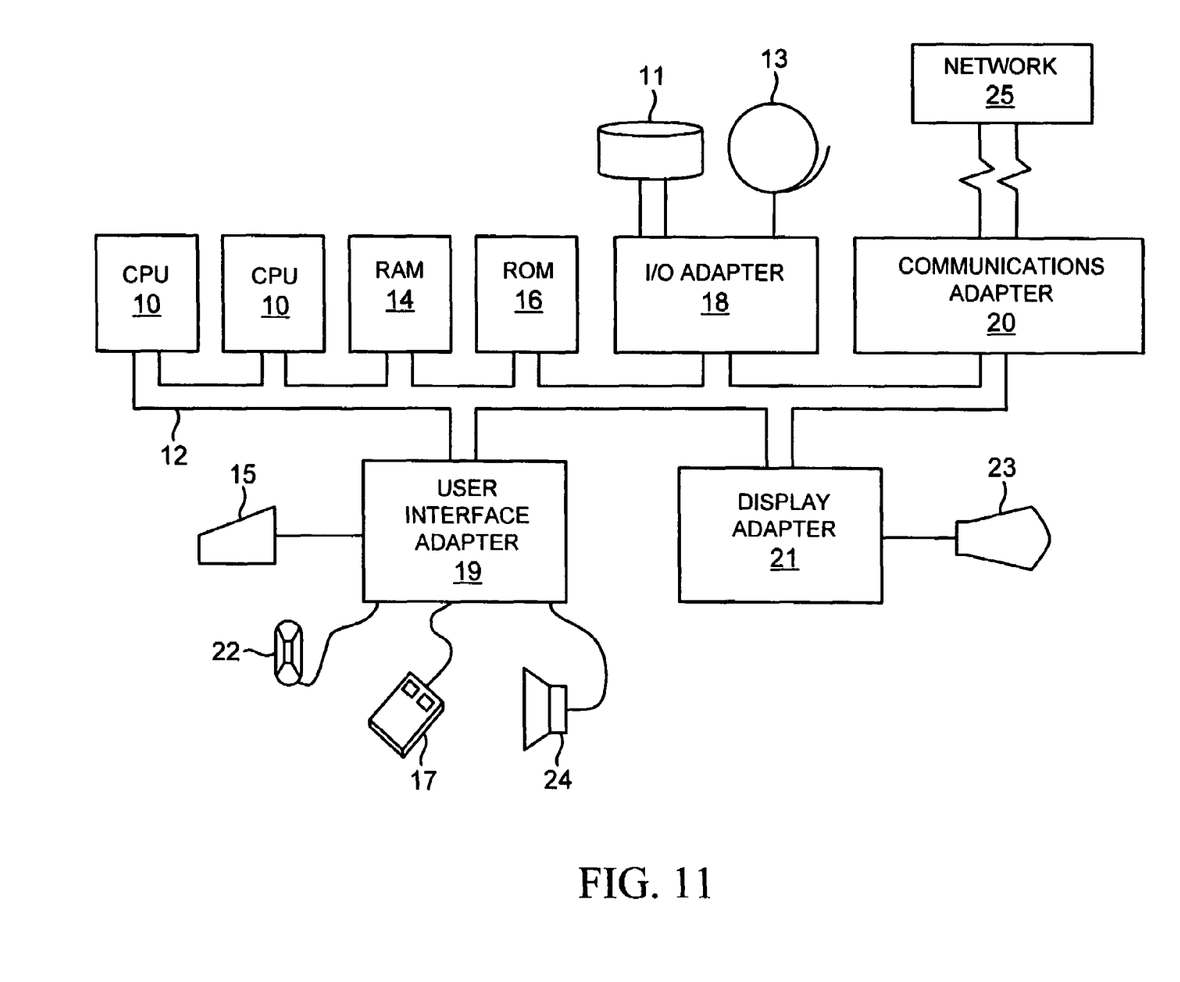
FIG. 11 is a computer system diagram according to an embodiment of the invention.

A representative hardware environment for practicing the embodiments of the invention is depicted in FIG. 11. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

As indicated in FIGS. 1 through 11, the embodiments of the invention provide an attitude determination system 100 that employs magnetometers 104 and angular rate sensors 106 with a DSP 108 to provide a complete solution for all three Euler angles that describe the attitude of a projectile 102. Unlike some conventional attitude estimation systems that rely exclusively on costly rate gyroscopes, the embodiments of the invention use magnetometers 104 to stabilize drift errors. Moreover, the embodiments of the invention fulfill the requirements of passive sensing and high-G (e.g., 80,000 G) survivability.

The foregoing description of the specific embodiments will so fully reveal the general nature of the embodiments of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention has been described in terms of preferred embodiments, those skilled in the art will recognize that the embodiments of the invention can be practiced with modification within the spirit and scope of the appended claims.

What is claimed is:

1. A method of performing attitude determination for projectiles, said method comprising:
    launching a projectile comprising a plurality of magnetometers arranged orthogonally to one another and a plurality of angular rate sensors proximate to said plurality of magnetometers;
    taking first flight vector measurements of said projectile using said plurality of magnetometers;
    taking second flight vector measurements of said projectile using said plurality of angular rate sensors;
    combining said first and second flight vector measurements to estimate Euler angles associated with a position of said projectile; and
    determining an attitude of said projectile based on the estimated Euler angles.

2. The method of claim 1, wherein said plurality of magnetometers comprises three magnetometers aligned within said projectile, and wherein a first one of said magnetometers is aligned with a spin axis of said projectile.

3. The method of claim 1, wherein an output of each of said magnetometers is proportional to a component of a magnetic field in a direction of a sensitive axis of each of said magnetometers.

4. The method of claim 1, further comprising:
    obtaining Earth magnetic field vectors from coordinates of a launch of said projectile; and
    obtaining an initial azimuth angle in a magnetic coordinate system.

5. The method of claim 4, further comprising: transforming said magnetic coordinate system into a projectile navigation coordinate system.

6. The method of claim 1, further comprising: calculating an elevation angle and a roll angle of said projectile based on said first flight vector measurements.

7. A system for performing attitude determination for projectiles, said system comprising:
    a projectile;
    a plurality of magnetometers arranged orthogonally to one another in said projectile, wherein said plurality of magnetometers is adapted to take first flight vector measurements of said projectile;
    a plurality of angular rate sensors in said projectile and proximate to said plurality of magnetometers, wherein said plurality of angular rate sensors is adapted to take second flight vector measurements of said projectile;
    a digital signal processor adapted to combine said first and second flight vector measurements to estimate Euler angles associated with a position of said projectile; and
    a calculator adapted to determine an attitude of said projectile based on the estimated Euler angles.

8. The system of claim 7, wherein said plurality of magnetometers comprises three magnetometers aligned within said projectile, and wherein a first one of said magnetometers is aligned with a spin axis of said projectile.

9. The system of claim 7, wherein an output of each of said magnetometers is proportional to a component of a magnetic field in a direction of a sensitive axis of each of said magnetometers.

10. The system of claim 7, wherein said processor is further adapted to:
    obtain Earth magnetic field vectors from coordinates of a launch of said projectile; and
    obtain an initial azimuth angle in a magnetic coordinate system.

11. The system of claim 10, wherein said processor is further adapted to transform said magnetic coordinate system into a projectile navigation coordinate system.

12. The system of claim 7, wherein said processor is further adapted to calculate an elevation angle and a roll angle of said projectile based on said first flight vector measurements.

* * * * *